3,467,655
ORGANOPHOSPHORUS INSECTICIDES DERIVED FROM MONO- AND DI-OXO BENZOXAZINES
Michio Nakanishi, Oita, and Atsushi Tsuda and Shuji Inamasu, Fukuoka, Japan, assignors to Yoshitomi Pharmaceutical Industries, Ltd., Higashi-ku, Osaka, Japan
No Drawing. Filed Apr. 5, 1967, Ser. No. 628,560
Claims priority, application Japan, Apr. 5, 1966, 41/21,598; Nov. 15, 1966, 41/75,062; Nov. 16, 1966, 41/75,600
Int. Cl. C07f 9/08, 9/40; A01n 9/36
U.S. Cl. 260—244    13 Claims

ABSTRACT OF THE DISCLOSURE

Organophosphorus compounds of the formula

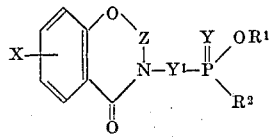

wherein

X is H, halogen or alkyl with a maximum of 4 carbon atoms,

Z is carbonyl, alkylidene with a maximum of 6 carbon atoms, benzylidene or cyclohexylidene, =Y is =O or =S, —$Y^1$— is —O— or —$CH_2$—$Y^2$— in which —$Y^2$— is —O— or —S— directly bound to

$R^1$ is methyl or ethyl, and
$R^2$ is methoxy, ethoxy or phenyl, are effective insecticides and miticides with low toxicity to to warmblooded animals and of low residual toxicity.

---

This invention relates to organophosphorus compounds and insecticidal and miticidal compositions containing the same.

The organophosphorus compounds are of the formula

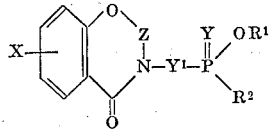  (I)

wherein

X is H, halogen or alkyl with a maximum of 4 carbon atoms,

—Z— is =CO, alkylidene with a maximum of 6 carbon atoms, benzylidene or cyclohexylidene, =Y is =O or =S, —$Y^1$— is —O— or —$CH_2$—$Y^2$— in which —$Y^2$— is —O— or —S— directly bound to

$R^1$ is methyl or ethyl, and
$R^2$ is methoxy, ethoxy or phenyl.

In the above-mentioned formula the halogen is exemplified by Cl, Br, etc., the alkyl of a maximum of 4 carbon atoms by —$CH_3$, —$C_2H_5$, n-$C_3H_7$, n-$C_4H_9$, sec-$C_4H_9$ and tert-$C_4H_9$, etc., and the alkylidene of a maximum of 6 carbon atoms by =$CHCH_3$, =$C(CH_3)_2$, =$CHC_2H_5$, =$C(CH_3)(C_2H_5)$, =$C(C_2H_5)_2$, =$CH(CH_2)_2CH_3$ =$CHCH(CH_3)_2$, =$CH(CH_2)_3CH_3$ and =$CH(CH_2)_4CH_3$, etc. When —$Y^1$— is —$CH_2$—$Y^2$—, Compound I has the formula

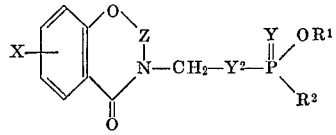

The present Compounds I are prepared either (i) by reacting a compound of the formula

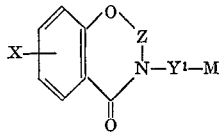

wherein M is H or alkali metal (e.g. sodium, potassium, etc.) and X, Z and $Y^1$ are as above defined, with a compound of the formula

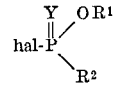

wherein hal is halogen (e.g. chlorine, bromine, etc.) and $R^1$, $R^2$ and Y are as above defined, or (ii) by reacting a compound of the formula

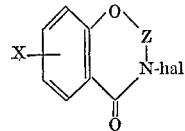

wherein hal is halogen and X and Z are as above defined, with a compound of the formula

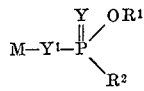

wherein M is H or alkali metal, and $R^1$, $R^2$, Y and $Y^1$ are as above defined. Either reaction is carred out in a solvent (e.g. methanol, ethanol, acetone, dimethylformamide) at 10–100° C., preferably at room temperature (20–30° C.) or with a little heating or cooling, for about 0.5 to several hours. When M is H, the presence of a basic substance (e.g. potassium or sodium hydroxide or carbonate, triethylamine, pyridine) is advantageous.

Typical but non-limitative examples of the preparation of the compounds of the invention are as follows. Parts by weight bear the same relationship to parts by volume as do grams to milliliters.

Example 1

6.1 parts by weight of O,O-diethyl chlorothiophosphate is stirred dropwise into a mixture of 5.4 parts by weight of 3-hydroxy-2,4-dioxo-2,3-dihydro-4H-1,3-benzoxazine, 4 parts by weight of pyridine and 45 parts by volume of dimethylformamide. The solution is stirred at room temperature for 3 hours, and then poured into 200 parts by volume of iced water. The precipitate formed is separated and recrystallized from ethanol to give 8 parts by weight of colorless crystals of O,O-diethyl O-(2,4-dioxo-2,3-dihydro-4H-1,3-benzoxazine-3-yl)phosphorothioate with a melting point of 107–108.5° C.

Analysis.—Calculated for $C_{12}H_{14}O_6NSP$: C, 43.50; H, 4.26; N, 4.23. Found: C, 43.82; H, 4.28; N, 4.18

Example 2

1.95 parts by weight of potassium O,O-dimethyl thiophosphate is added portionwise to a stirred solution of 2.43 parts by weight of 3-bromo-2,4-dioxo-2,3-dihydro-4H-1,3-benzoxazine in 25 parts by volume of dimethylformamide at 20–30° C. The mixture is stirred for 3 hours at room temperature, and poured into iced water. The precipitate formed is separated by filtration and recrystallized from ethanol to give 1.3 parts by weight of white crystals of O,O-dimethyl O-(2,4-dioxo-2,3-dihydro-4H-1,3-benzoxazin-3-yl)phosphorothioate with a melting point of 101–103° C.

Example 3

A solution of 2.2 parts by weight of 3-chloromethyl-6-methyl-2,4-dioxo-2,3-dihydro-4H-1,3-benzoxazine and 2.5 parts by weight of potassium O,O-diethylthiophosphate in 25 parts by volume of acetone is heated under reflux for an hour, cooled, filtered to remove precipitate (KCl), concentrated, dissolved in 50 parts by volume of benzene, washed with two portions of water, dried over anhydrous magnesium sulfate and concentrated to give 2.3 parts by weight of a transparent oil of O,O-diethyl O-[(6-methyl-2,4-dioxo-2,3-dihydro-4H-1,3-benzoxazin-3-yl)methyl]phosphorothioate, $n_D^{25}$=1.5364.

*Analysis.*—Calculated for $C_{14}H_{18}O_6NSP$: C, 46.79; H, 5.05; N, 3.90. Found: C, 46.43; H, 4.89; N, 3.95.

Example 4

3.2 parts by weight of O,O-dimethyl chlorothiophosphate is added to a stirred solution of 3.86 parts by weight of 2,3-dihydro-3-hydroxy-2-ethyl-4-oxo-4H-1,3-benzoxazine in 35 parts by volume of methanol containing 1.35 g. of potassium hydroxide. The mixture is stirred for 2 hours at room temperature, the methanol then distilled off, chloroform added to the residue, and the solution washed with two portions of water, dried, and concentrated. The residue is recrystallized from ethanol to give 3.6 parts by weight of O,O-dimethyl O-(2-ethyl-4-oxo-2,3-dihydro-4H-1,3-benzoxazine-3-yl)phosphorothioate melting at 78–79° C.

These and other organophosphorus compounds which can thus be obtained are listed in the following table:

TABLE

| Example | X | =Z | —Y¹— | —Y— | R¹ | R² | |
|---|---|---|---|---|---|---|---|
| 1 | H | =CO | —O— | —S— | $C_2H_5$ | $OC_2H_5$ | |
| 2 | H | =CO | —O— | —S— | $CH_3$ | $OCH_3$ | |
| 3 | 6-$CH_3$ | =CO | —$CH_2$O— | —S— | $C_2H_5$ | $OC_2H_5$ | |
| 4 | H | =CH$C_2H_5$ | —O— | —S— | $CH_3$ | $OCH_3$ | |
| 5 | H | =CO | —O— | —O— | $C_2H_5$ | $OC_2H_5$ | White crystals, M.P. 88–90° C. (diisopropyl ether).* |
| 6 | H | =CO | —$CH_2$O— | —S— | $C_2H_5$ | $OC_2H_5$ | White needles, M.P. 79–82° C. (diisopropyl ether-ethanol (20:1)). |
| 7 | H | =CO | —$CH_2$S— | —S— | $CH_3$ | $OCH_3$ | White wax, M.P. 35–40° C. (petroleum ether). |
| 8 | H | =CO | —$CH_2$S— | —S— | $C_2H_5$ | $OC_2H_5$ | White needles, M.P. 55–57° C. (ethanol). |
| 9 | H | =CO | —$CH_2$O— | —S— | $CH_3$ | $OCH_3$ | White needles, M.P. 120–125° C. (diisopropyl ether-ethanol (20:1)). |
| 10 | 6-$CH_3$ | =CO | —$CH_2$S— | —S— | $C_2H_5$ | $OC_2H_5$ | Colorless needles, M.P. 82–84° C. (ethanol). |
| 11 | 6-$CH_3$ | =CO | —$CH_2$S— | —S— | $CH_3$ | $OCH_3$ | Semitransparent crystals, M.P. 58–59° C. (ethanol). |
| 12 | 6-Br | =CO | —$CH_2$S— | —S— | $C_2H_5$ | $OC_2H_5$ | White amorphous powder, M.P. 77–80° C. (ethanol). |
| 13 | 6-Br | =CO | —$CH_2$O— | —S— | $C_2H_5$ | $OC_2H_5$ | White needles, M.P. 103–105.5° C. (ethanol). |
| 14 | 6-Br | =CO | —$CH_2$S— | —S— | $CH_3$ | $OCH_3$ | Crystals, M.P. 40–45° C. (aqueous methanol). |
| 15 | 8-$CH_3$ | =CO | —$CH_2$S— | —S— | $C_2H_5$ | $OC_2H_5$ | Crystals, M.P. 75–77° C. (ethanol). |
| 16 | 6-$C(CH_3)_3$ | =CO | —O— | —S— | $C_2H_5$ | $OC_2H_5$ | Pale yellow oil, $n_D^{25}$=1.532. |
| 17 | 6-$CH_3$ | =CO | —O— | —S— | $C_2H_5$ | $OC_2H_5$ | Transparent oil. |
| 18 | 6-$CH_3$ | =CO | —O— | —S— | $CH_3$ | $OCH_3$ | White needles, M.P. 92–93.5° C. (ethanol). |
| 19 | 6-Br | =CO | —O— | —O— | $C_2H_5$ | $OC_2H_5$ | White amorphous powder, M.P. 105–110° C. (ethanol). |
| 20 | 8-$CH_3$ | =CO | —O— | —S— | $C_2H_5$ | $OC_2H_5$ | Colorless scales, M.P. 55–58° C. (ethanol). |
| 21 | 8-$CH_3$ | =CO | —O— | —S— | $CH_3$ | $OCH_3$ | Colorless scales, M.P. 124–128° C. (ethanol.) |
| 22 | H | =CHCH($CH_3$)$_2$ | —O— | —S— | $CH_3$ | $OCH_3$ | White crystals, M.P. 41–43.5° C. (petroleum benzine). |
| 23 | H | =CHCH($CH_3$)$_2$ | —O— | —S— | $C_2H_5$ | $OC_2H_5$ | Pale brown oil. |
| 24 | H | =C(CH$_2$)$_4$CH$_2$ | —O— | —S— | $CH_3$ | $OCH_3$ | White crystals, M.P. 64–66° C. (petroleum benzine). |
| 25 | H | =C(CH$_2$)$_4$CH$_2$ | —O— | —S— | $C_2H_5$ | $OC_2H_5$ | White crystals, M.P. 78–81° C. (petroleum benzine). |
| 26 | H | =CH— | —O— | —S— | $CH_3$ | $OCH_3$ | White crystals, M.P. 110–112° C. (ethanol). |
| 27 | H | =CH— | —O— | —S— | $C_2H_5$ | $OC_2H_5$ | White crystals, M.P. 45–46° C. (ethanol). |
| 28 | H | =CHCH$_3$ | —O— | —S— | $CH_3$ | $OCH_3$ | White crystals, M.P. 82.5–84° C. (ethanol.) |
| 29 | H | =CHCH$_3$ | —O— | —S— | $C_2H_5$ | $OC_2H_5$ | White crystals, M.P. 80–81.3° C. (ethanol). |
| 30 | H | =CH$C_2H_5$ | —O— | —S— | $C_2H_5$ | $OC_2H_5$ | Pale yellowish brown oil. |
| 31 | H | =CH$C_2H_5$ | —O— | —O— | $C_2H_5$ | $OC_2H_5$ | Pale brown oil, $n_D^{20.6}$=1.5080. |
| 32 | H | =CH(CH$_2$)$_2$CH$_3$ | —O— | —S— | $CH_3$ | $OCH_3$ | Pale yellow oil, $n_D^{23}$=1.5420. |
| 33 | H | =CH(CH$_2$)$_2$CH$_3$ | —O— | —S— | $C_2H_5$ | $OC_2H_5$ | Pale yellow oil, $n_D^{23}$=1.5280. |
| 34 | H | =CHCH(CH$_3$)$_2$ | —O— | —O— | $C_2H_5$ | $OC_2H_5$ | White crystals, M.P. 47–49° C. (petroleum benzine). |
| 35 | H | =CH(CH$_2$)$_3$CH$_3$ | —O— | —S— | $C_2H_5$ | $OC_2H_5$ | Pale brown oil, $n_D^{23}$=1.5278. |
| 36 | H | =CH(CH$_2$)$_4$CH$_3$ | —O— | —S— | $CH_3$ | $OCH_3$ | Pale brown oil, $n_D^{21.5}$=1.5342. |
| 37 | H | =CH(CH$_2$)$_4$CH$_3$ | —O— | —S— | $C_2H_5$ | $OC_2H_5$ | Pale brown oil, $n_D^{20}$=1.5237. |
| 38 | H | =CH(CH$_2$)$_4$CH$_3$ | —O— | —O— | $C_2H_5$ | $OC_2H_5$ | Pale brown oil, $n_D^{18}$=1.5029. |
| 39 | H | =C(CH$_2$)$_4$CH$_2$ | —O— | —O— | $C_2H_5$ | $OC_2H_5$ | Pale red oil, $n_D^{22}$=1.5183. |
| 40 | H | =C(CH$_3$)$_2$ | —O— | —S— | $CH_3$ | $OCH_3$ | Pale yellowish brown oil, $n_D^{28}$=1.5470. |
| 41 | H | =C(CH$_3$)$_2$ | —O— | —S— | $C_2H_5$ | $OC_2H_5$ | Pale brown oil, $n_D^{21}$=1.5322. |
| 42 | H | =C(CH$_3$)$_2$ | —O— | —O— | $C_2H_5$ | $OC_2H_5$ | Pale reddish brown oil, $n_D^{22.5}$=1.5101. |
| 43 | H | =C(CH$_3$)(C$_2$H$_5$) | —O— | —S— | $CH_3$ | $OCH_3$ | Pale brown oil, $n_D^{23}$=1.5475. |
| 44 | H | =C(CH$_3$)(C$_2$H$_5$) | —O— | —S— | $C_2H_5$ | $OC_2H_5$ | Pale brown oil, $n_D^{25}$=1.5333. |
| 45 | H | =C(CH$_3$)(C$_2$H$_5$) | —O— | —O— | $C_2H_5$ | $OC_2H_5$ | Pale brown oil, $n_D^{24.5}$=1.5094. |
| 46 | H | =CH— | —O— | —S— | $C_2H_5$ |  | Crystals, M.P. 80–83° C. |

*The compound included in parenthesis is, throughout this table, the solvent used for recrystallization.

The compound of Example 5 is diethyl(2,4-dioxo-2,3-dihydro-4H-1,3-benzoxazin-3-yl) phosphate.

The compound of Example 7 is O,O-dimethyl S-[(2,4-dioxo-2,3-dihydro-4H-1,3-benzoxazin-3-yl)-methyl] phosphorodithioate.

The compound of Example 8 is O,O-diethyl S-[(2,4-dioxo-2,3-dihydro-4H-1,3-benzoxazin-3-yl) methyl] phosphorodithioate.

The compound of Example 13 is O,O-diethyl O-[(6-bromo-2,4-dioxo-2,3-dihydro-4H-1,3-benzoxazin - 3 - yl) methyl] phosphorothioate.

The compound of Example 20 is O,O-diethyl O-(8-methyl-2,4-dioxo-2,3-dihydro-4H-1,3-benzoxazin - 3 - yl) phosphorothioate.

The compound of Example 22 is O,O-dimethyl O-(2-isopropyl-4-oxo-2,3-dihydro-4H-1,3 - benzoxazin - 3 - yl) phosphorothioate.

The compound of Example 27 is O,O-diethyl O-(2-phenyl-4-oxo-2,3-dihydro-4H-1,3-benzoxazin-3 - yl) phosphorothioate.

The compound of Example 29 is O,O-diethyl O-(2-methyl-4-oxo-2,3-dihydro-4H-1,3-benzoxazin-3 - yl) phosphorothioate.

The compound of Example 30 is O,O-diethyl O-(2-ethyl-4-oxo-2,3-dihydro-4H-1,3-benzoxazin - 3 - yl) phosphorothioate.

The compound of Example 23 is O,O-diethyl O-(2-isopropyl-4-oxo-2,3-dihydro-4H-1,3-benzoxazin-3 - yl) phosphorothioate.

The compound of Example 35 is O,O-diethyl O-(2-butyl-4-oxo-2,3-dihydro-4H-1,3-benzoxazin-3-yl) phosphorothioate.

The Compounds I are insecticides and miticides with low order of toxicity to warm-blooded animals. They can effectively kill various agricultural and household pests such as flies (e.g., housefly), mosquitoes (e.g., Culex species), weevils (e.g. Adzuki bean weevil), cockroaches (e.g. German cockroach), green rice leafhoppers, rice stem borer, mites and aphids. Although they are stable in anhydrous state, they are relatively rapidly hydrolyzed in the presence of water into still less toxic or practically non-toxic substances after killing the pests. Therefore they can be used safely and without anxiety of residual problems. Moreover the odor characteristic to organophosphorus insecticides is slight or not perceptible, and therefore the baits containing them may be in particular favorable and preferable, e.g., to cockroaches. Furthermore many of them are solids and this fact is advantageous in their handling.

Test 1

Median lethal dose ($LD_{50}$) against the housefly *Musca domestica vicina* (Takatsuki strain) was determined from mortalities after 24 hours by topical application method using acetone solutions as follows:

| Compound of Example— | $LD_{50}(\gamma/\text{fly})$ |
| --- | --- |
| 1 | 0.027 |
| 2 | 0.214 |
| 4 | 0.384 |
| 5 | 0.077 |
| 6 | 0.096 |
| 7 | 0.24 |
| 8 | 0.17 |
| 9 | 0.15 |
| 11 | 0.79 |
| 12 | 0.42 |
| 13 | 0.13 |
| 16 | 0.51 |
| 17 | 0.77 |
| 18 | 0.57 |
| 20 | 0.22 |
| 21 | 0.29 |
| 22 | 0.45 |
| 23 | 0.12 |
| 24 | 0.85 |
| 25 | 0.70 |
| 26 | 0.35 |
| 27 | 0.16 |
| 28 | 0.256 |
| 29 | 0.096 |
| 30 | 0.08 |
| 40 | 0.20 |
| 46 | 0.53 |

Test 2

One milliliter of 0.5% acetone solution of each of the compounds of Examples 3, 6, 7, 8, 9 and 16, spread on the bottom of a petri dish (9 cm. diameter) and air-dried, killed 100% of 10 individuals of the German cockroach *Blatella germanica* Linné brought into contact with the compound on the bottom in 24 hours.

Test 3

Compounds of Examples 7, 20 and 30 each dissolved in acetone and topically applied to 10 rice stem borers (*Chilo suppressalis* Walker) at the dose of $50\gamma$/borer, killed 100% of the borers in 24 hours.

Test 4

Leaves of the kidney bean infested with the Kanzawa spider mite *Tetranychus kanzawai* Kishida were sprayed with a 0.05% acetone solution of the compound of Examples 1, 5, 6, 7, 8, 10, 12 or 13. The leaves were kept 2 days at 28° C. and then microscopic observation was made. In each case the mortality of the mite was 100%.

Test 5

The oral $LD_{50}$ in mice was determined as follows:

| Compound of Example— | $LD_{50}(\text{mg./kg.})$ |
| --- | --- |
| 1 | 512 |
| 2 | 1900 |
| 5 | 104 |
| 23 | 2900 |
| 27 | 1850 |
| Parathion | 5.2 |

Test 6

The rate of hydrolysis was evaluated by measuring the electric conductivity change of the saturated solution of the test compound prepared by dissolving 100 mg. of the compound in a small amount of methanol, adding a surface active agent and diluting the solution with 100 ml. of water. The hydrolysis supposedly proceeds as follows:

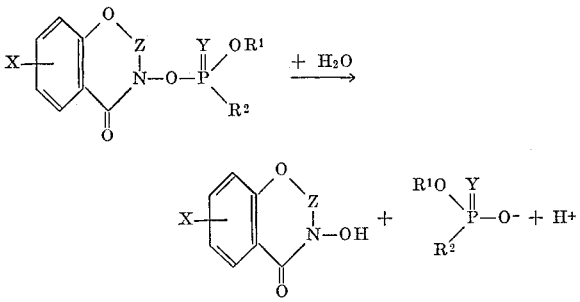

and therefore the conductivity increase (K, mho./hr.) is a measure of the hydrolysis rate. Results were as follows:

| Compound of Example— | K(mho./hr.) |
| --- | --- |
| 1 | 5.92 |
| 2 | 119.5 |
| 16 | 0.53 |
| 18 | 892 |
| 22 | 1.52 |
| 23 | 2.78 |
| 24 | 1.10 |
| 27 | 0.33 |

| Compound of Example— | K(mho./hr.) |
|---|---|
| 28 | 1.29 |
| 29 | 3.78 |
| 30 | 1.54 |
| 40 | 0.59 |
| Parathion | 0.13 |

Insecticidal and miticidal compositions are prepared by mixing at least one of the organophosphorus compounds of the invention such as above described with a suitable carrier therefor in a per se known manner. The carrier is, for example, liquid such as benzene, toluene, xylene, acetone, methyl, isobutyl ketone, dimethylformamide, solvent naphtha, methylnaphthalene, kerosene; solid such as talc, clay, bentonite, kaolin, diatomaceous earth, fish meal, or a mixture or these. The compositions may contain a surface active agent such as polyoxyethylene alkyl (or alkylphenyl) ether or polyoxyethylene-sorbitan fatty acid ester, or other adjuvants. Thus, the compositions may take the form of emulsions or emulsifiable concentrates, wettable powders, dusts, solutions, or baits. The compositions may also contain other insecticides and miticides as well as fungicides, herbicides, fertilizers, etc.

Examples of formulations are as follows (parts being by weight):

Example 47 (dust): Parts
- Any Compound I ___ 2
- Clay or talc ___ 98

Example 48 (emulsifiable concentrate):
- Any Compound I ___ 25–80
- Dimethylformamide ___ 20
- Xylene ___ 30
- Methoxyethyl acetate ___ 10
- Polyoxyethylene nonylphenyl ether ___ 15

Example 49 (solution):
- Any Compound I ___ 3
- Methylnaphthalene ___ 30
- Kerosene ___ 50
- Methyl isobutyl ketone ___ 10
- Tributyl phosphate ___ 7

Example 50 (bait):
- Any Compound I ___ 1
- Fish meal ___ 10
- Bran ___ 50
- Sawdust ___ 20
- Beef tallow ___ 4
- Starch ___ 15

What is claimed is:
1. An organophosphorus compound of the formula

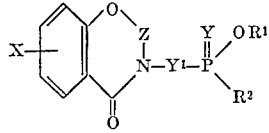

wherein
X is H, halogen or alkyl of up to 4 carbon atoms,
Z is carbonyl, alkylidene of up to 6 carbon atoms, benzylidene or cyclohexylidene,
Y is —O— or —S—,
—Y$^1$— is —O— or —CH$_2$—Y$^2$— in which —Y$^2$— is —O— or —S— directly bound to

R$^1$ is methyl or ethyl, and
R$^2$ is methoxy, ethoxy or phenyl.

2. The compound O,O-diethyl O-(2,4-dioxo-2,3-dihydro-4H-1,3-benzoxazin-3-yl) phosphorothioate.
3. The compound diethyl (2,4-dioxo-2,3-dihydro-4H-1,3-benzoxazin-3-yl) phosphate.
4. The compound O,O-dimethyl S-[(2,4-dioxo-2,3-dihydro-4H - 1,3 - benzoxazin - 3 - yl)methyl] phosphorodithioate.
5. The compound O,O-diethyl S-[(2,4-dioxo-2,3-dihydro-4H-1,3-benzoxazin-3-yl)methyl] phosphorodithioate.
6. The compound O,O-diethyl O-[(6-bromo-2,4-dioxo-2,3-dihydro-4H-1,3-benzoxazin-3-yl)methyl] phosphorothioate.
7. The compound O,O-diethyl O-(8-methyl-2,4-dioxo-2,3-dihydro-4H-1,3-benzoxazin-3-yl) phosphorothioate.
8. The compound O,O-dimethyl O-(2-isopropyl-4-oxo-2,3-dihydro-4H-1,3-benzoxazin-3-yl) phosphorothioate.
9. The compound O,O-diethyl O-(2-phenyl-4-oxo-2,3-dihydro-4H-1,3-benzoxazin-3-yl) phosphorothioate.
10. The compound O,O-diethyl O-(2-methyl-4-oxo-2,3-dihydro-4H-1,3-benzoxazin-3-yl) phosphorothioate.
11. The compound O,O-diethyl O-(2-ethyl-4-oxo-2,3-dihydro-4H-1,3-benzoxazin-3-yl) phosphorothioate.
12. The compound O,O-diethyl O-(2-isopropyl-4-oxo-2,3-dihydro-4H-1,3-benzoxazin-3-yl) phosphorothioate.
13. The compound O,O-diethyl O-(2-butyl-4-oxo-2,3-dihydro-4H-1,3-benzoxazin-3-yl) phosphorothioate.

References Cited

UNITED STATES PATENTS
2,706,194  4/1955  Morris et al. ___ 260—244
2,992,219  7/1961  McConnell et al. ___ 260—244

OTHER REFERENCES

Chemical Abstracts I, vol. 64, Subject Index P–Z, pp. 2578S, 2580S, 2585S, 2596S, 2597S, 2610S, 2612S, and 2613S (1966).

Chemical Abstracts II: The naming and indexing of chemical compounds introduction to subject index of volume 56, p. 90N (1962).

Rhone-Poulenc: Chem. Abst., vol. 63, column 18092 (1965).

HENRY R. JILES, Primary Examiner

NATALIE TROUSOF, Assistant Examiner

U.S. Cl. X.R.
424—200